May 25, 1926.
V. A. NOBLE
1,586,003
FOOT ACCELERATOR
Filed March 25, 1926
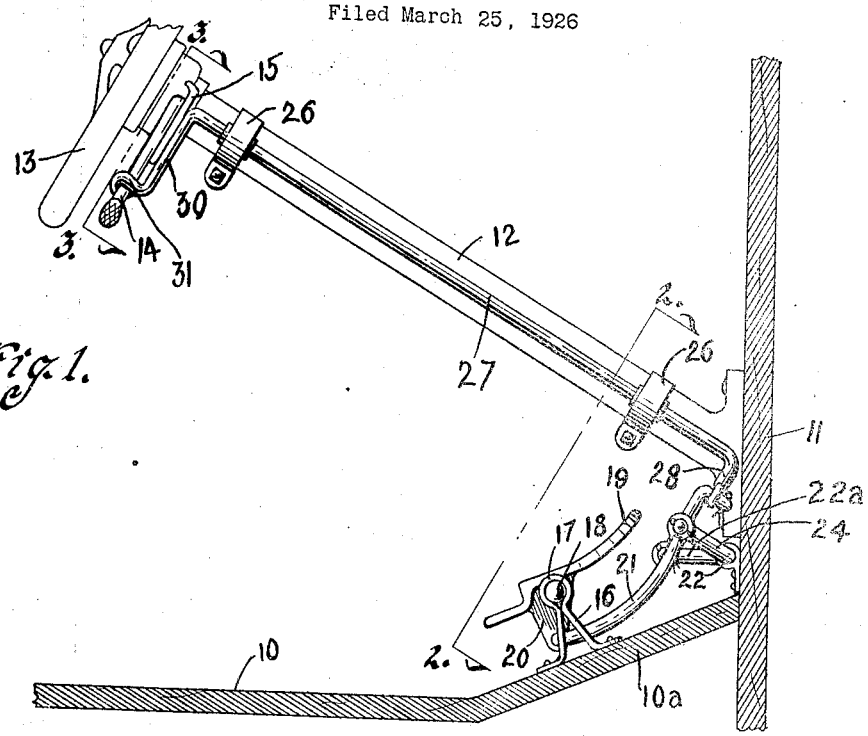
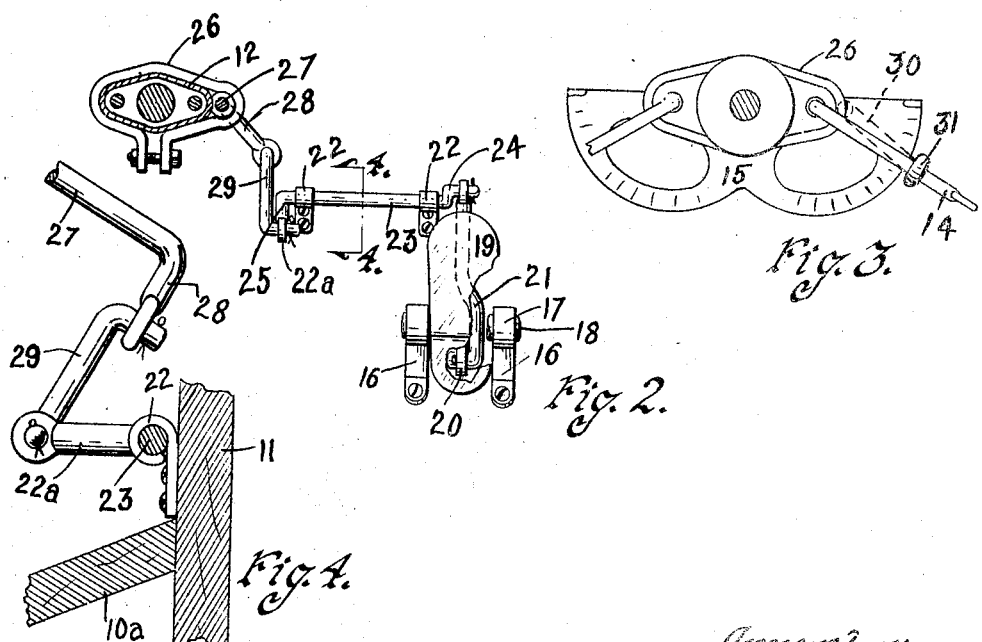
Witness
L. V. Sandberg
Inventor
Victor A. Noble
by Bair & Freeman Attorneys Patented May 25, 1926.

1,586,003

UNITED STATES PATENT OFFICE.

VICTOR A. NOBLE, OF LAURENS, IOWA.

FOOT ACCELERATOR.

Application filed March 25, 1926. Serial No. 97,265.

The object of my invention is to provide a foot accelerator for motor vehicles or the like.

More particularly, it is my object to provide such an accelerator of very simple and inexpensive construction, which can be readily and easily mounted on a motor vehicle without in any way interfering with or changing the ordinary equipment thereof.

Another purpose is to provide such a device including a foot pedal, means for actuating the ordinary throttle control lever mounted on the steering post, and suitable simple means for connecting the pedal and said actuating means.

With these and other objects in view, my invention consists in the construction, arrangement and combination of the various parts of my foot accelerator, whereby the objects contemplated are attained, as hereinafter more fully set forth pointed out in my claims, and illustrated in the accompanying drawings, in which:

Figure 1 is a vertical, sectional view of the floor and dash of a motor vehicle having a steering post and a throttle lever, and equipped with a foot accelerator embodying my invention.

Figure 2 is a detail, sectional view taken on the line 2—2 of Figure 1.

Figure 3 is a detail, sectional view taken on the line 3—3 of Figure 1; and

Figure 4 is a detail, sectional view taken on the line 4—4 of Figure 2, the floor board and dash being shown in elevation.

In the accompanying drawings, I have used the reference numeral 10 to indicate the floor of a motor vehicle having the dash 11. Extending upwardly and rearwardly from the dash 11 is the ordinary steering post received in the steering post tube or casing 12.

At the upper end of the steering post is the steering wheel 13. Adjacent to the steering wheel is the throttle control lever 14 adapted to be swung on the supporting sector 15 for regulating the throttle valve of the carburetor.

It is my purpose to provide a foot accelerator whereby the throttle control lever may be actuated from the foot pedal by simple and inexpensive connecting means.

My improved throttle control comprises a pair of brackets 16 designed to be secured to the inclined portion 10ª of the floor of the motor vehicle. The brackets 16 have the aligned bearings 17. In the bearings 17, I mount a spindle 18. A suitable foot pedal 19 is mounted on the spindle 18 and is provided with a downwardly projecting arm 20. Pivoted to the arm 20 is the rear end of a curved link 21, which extends forwardly and upwardly in the motor vehicle.

On the lower rear part of the dash 11 just above the inclined floor portion 10ª are horizontally spaced bearing brackets 22 in which is mounted the rock shaft 23, having at its opposite ends the cranks 24 and 25.

The upper forward end of the link 21 is pivoted to the crank arm 24 of the rock shaft 23. Suitable bearing brackets 26 are mounted on the steering post tube or casing 12 and journaled in the brackets 26 is a rock shaft or rod 27 having at its lower end the crank arm 28. A link 29 has its ends pivoted respectively to the arm 28 on the rock shaft 27 and the arm 25 on the rock shaft 23.

At the upper end of the rock shaft 28 is a crank arm 30 having formed at its outer end a loop 31 loosely receiving the throttle control lever 14.

It should perhaps be mentioned that the foot pedal 19 has portions projecting both forwardly and rearwardly from the pivot pin or spindle 18, so that the pedal may be operated by the toe or heel of the shoe of the operator.

The parts are so constructed that in actual operation, the operator can push the forward or toe portion of the pedal 19 downwardly, thereby swinging the arm 20 of the pedal rearwardly and downwardly carrying with it the link 21 and the arm 24 and rocking the shaft 23. This rocking movement of the shaft 23 swings the arm 22ª and link 29 and arm 28 for rocking the shaft 27, and thereby swinging the arm 30 for actuating the throttle control lever 14 for opening the throttle.

The reverse movement of the throttle control lever may be accomplished by pressing downwardly on the heel portion of the foot pedal 19.

It will be observed that the throttle control lever may be used as a hand control in the ordinary way, because the parts are all freely moving and the hand actuation of the throttle control lever will readily actuate the foot pedal.

It will be seen that I have provided a very simple and inexpensive foot accelerator, which is mounted entirely within the body of the car and does not require cutting through the dash or mounting any separate parts on the engine or in any way interfering with the ordinary equipment.

Some changes may be made in the details of the construction and arrangement of the parts of my improved foot accelerator without departing from the real spirit and purpose of my invention, and it is my intention to cover by my claims, any modified forms of structure or use of mechanical equivalents, which may be reasonably included within the scope of my invention and my claims.

I claim as my invention:

1. In a foot accelerator, a shaft adapted to be rotatably mounted on the steering post casing of a motor vehicle having at its upper end a crank arm adapted to be slidably mounted on a throttle control lever and having at its other end a crank arm, a pair of brackets, a rock shaft mounted therein having crank arms at its ends, a link pivoted to the lower crank arm on said first shaft, and to one of the crank arms on the rock shaft, a foot pedal, and means for pivotally mounting said foot pedal between its ends above the floor of a motor vehicle, an arm on said foot pedal, and a link pivoted to said arm and to the other crank on said rock shaft.

2. In a device of the class described, the combination of a motor vehicle structure including a floor, a dash, steering post, and a throttle control rod on said post, with a pair of spaced brackets mounted on said foot board, a pin journaled in said brackets, a foot pedal supported between its ends on said pin and having a downwardly projecting arm, a rock shaft journaled on said dash having cranks at its ends, a link connecting one of said cranks and said arm, and means for actuating said throttle control lever from the other of said cranks.

VICTOR A. NOBLE.